Patented Dec. 13, 1938

2,139,705

UNITED STATES PATENT OFFICE 2,139,705

EGG PRODUCT AND METHOD OF PREPARING THE SAME

Samuel Tranin, Kansas City, Mo.; Henry Hanssen executor of said Samuel Tranin, deceased, assignor to Tranin Egg Products Company, Kansas City, Mo.

No Drawing. Application July 9, 1934, Serial No. 734,416

8 Claims. (Cl. 99—113)

This invention relates to egg products such as are prepared by breaking eggs and freezing or drying the liquid eggs for preservation either as mixed whole eggs or separated yolks and whites, and has for its principal object to provide egg products of this character which not only perform their usual function in preparation of cakes, pastry shortenings, salad dressings and other food preparations, but which act as a vehicle for carrying large quantities of moisture uniformly through the food preparation, thereby increasing the volume and improving the texture of pastry preparations and providing a more homogeneous mixture in the case of salad dressings and like products in which the egg is used or wherein it is desirable to increase the moisture absorption.

Other important objects of the invention are to provide an egg product which is more easily put into solution, to provide a frozen egg product wherein the water content of the egg does not separate out when thawing, and to provide a compound which may be added to eggs at the time of use.

In accomplishing these and other objects of the invention as hereinafter pointed out, I have devised novel steps in preparation of an egg product or compound for market, as now to be described.

To prepare an egg compound in accordance with the present invention liquid egg, either whole, separated whites, or yolks, is coagulated and coagulated particles of the egg are widely dispersed in extremely fine form preferably throughout a water soluble paste.

One method of preparing the compound is as follows:

An acid solution is prepared by mixing 95 pounds of water and approximately 3 to 5 ounces of an edible acid such as lactic, tartaric, or the like. To this solution is then added approximately 5 pounds of an edible gum, for example, locust bean gum, to form a paste. To this is added sufficient egg, either whites, yolks or whole eggs, to form a water soluble mixture or paste. The entire mixture is then agitated to thoroughly distribute the egg therein so that the egg particles are coagulated by the acid and are retained in suspension by the gum.

Another method that might be used in preparing the compound is to add a very dilute acid solution directly to a portion of liquid egg. The mixture is then sprayed into a drying oven where the acidified egg particles are converted into fine powdered form. During the drying out process each particle is coagulated by the acid which coagulation progresses slowly for the reason that the acid becomes gradually stronger and the coagulation effect is increased as the drying out of the water constituent progresses. The compound as thus prepared consists of finely divided coagulated egg particles, which may be added to the edible gum paste to retain the particles in suspension.

Liquid egg might also be coagulated without the acid; for example, the liquid egg might be cooked, dried and then powdered.

The coagulated egg particles are, of course, insoluble in water but I have found that they are of sponge-like nature and are capable of absorbing large quantities of water in that they will swell to perhaps twenty times their normal size when placed in water.

Therefore, when the coagulated egg particles are inserted in a dough in preparation of a bakery product, this expansion absorbs moisture to increase the volume of the dough mix and results in a product having a large volume as well as more uniform and better texture and which retains its freshness over a longer period of time. The gum paste not only provides for dispersed coagulation of the egg particles but it also performs a most important function of permitting distribution of the coagulated particles throughout the dough, which is brought about by the ready solubility of the gum during the preparation of the dough. This is most important because, due to the insolubility of the coagulated egg particles, it is difficult to distribute them uniformly through the dough mass.

The compound, as above described, containing the coagulated egg particles may be packaged and sold as an ingredient to be added to the mixes in preparing various bakery products. However, the egg therein is not intended to nor does it replace the egg normally required in bakery and like products for the reason that while the particles are absorbent, they are not soluble and are not capable of adding lightness and other qualities which are required in cake and like doughs. For this reason uncoagulated liquid egg must be included in the dough mix. I therefore prefer to add the compound directly to liquid whole eggs, whites, or yolks and dispense the egg product to the consumer so that when the desired quantity of liquid egg is measured out, it also includes the proper amount of compound to give the required effect in the dough.

In preparing the egg product the compound may be added in paste form to liquid egg, which is then preserved by freezing, or the liquid egg and compound may be dried in flake or powdered form.

The egg product might also be prepared by adding coagulated egg particles in powdered form to either liquid egg or powdered or flaked egg without the inclusion of the edible gum.

When the liquid egg product is preserved by freezing, the particles of coagulated egg absorb the free water content of the liquid egg and do not allow separation of the water when the liquid egg is thawed out for use, thereby preventing the water from collecting on the top of the egg liquid, which water ordinarily sours and spoils the eggs. However, where the water is absorbed by the liquid egg particles and the particles are distributed uniformly throughout the mass of liquid egg, premature souring cannot occur.

From the foregoing it is apparent that a liquid egg product prepared as described contains egg particles which are capable of solution to perform the function for which eggs are used in preparing various dough mixes but also egg particles which are insoluble and yet have water absorption properties so that greater quantities of water can be injected into the dough to enhance quality of bakery products that are prepared therefrom.

When the egg product or the compound is used in the preparation of mayonnaise and like dressings, the coagulated egg particles absorb and thereby prevent separation of the water content thereof. It is thus evident that the dressings will have a more homogeneous consistency and be of better appearance.

What I claim and desire to secure by Letters Patent is:

1. The method of preparing an egg product, including subjecting liquid egg to an edible coagulating medium to effect coagulation of the egg, dispersing the coagulated egg in a water soluble paste including an edible gum to form a compound, and mixing the compound with uncoagulated liquid egg.

2. The method of preparing an egg product, including subjecting liquid egg to the action of an edible acid solution to effect coagulation of the egg, dispersing the coagulated egg in a water soluble paste including an edible gum to form a compound, and mixing the compound with a quantity of uncoagulated liquid egg.

3. The method of preparing an egg product, including subjecting liquid egg to the action of an edible acid solution to effect coagulation of the egg, dispersing the coagulated egg in a water soluble paste including an edible gum to form a compound, mixing the compound with a quantity of uncoagulated liquid egg, and drying the mixture.

4. The method of preparing an egg product, including subjecting liquid egg to the action of an edible acid solution to effect coagulation of the egg, dispersing the coagulated egg in a water soluble paste including an edible gum to form a compound, mixing the compound with a quantity of uncoagulated liquid egg, and freezing the mixture.

5. The method of preparing an egg product, including spraying a weak acid solution and liquid egg mixture in the presence of heat to effect dispersion of the liquid egg and coagulation of the dispersed egg particles, and mixing the coagulated egg particles with a larger quantity of uncoagulated egg particles.

6. The method of preparing an egg product including spraying a weak acid solution and liquid egg mixture in the presence of heat to effect dispersion of the liquid egg and coagulation of the dispersed egg particles, and mixing the coagulated egg particles with a larger quantity of uncoagulated egg particles in a locust bean gum mixture.

7. The method of preparing an egg product including subjecting liquid egg to the action of an edible acid solution to effect coagulation and provide particles of egg having water absorbtive properties, and mixing uncoagulated egg particles with the coagulated egg particles.

8. An egg product including a frozen mixture of uncoagulated liquid egg, a water soluble edible gum mixture, and acidified coagulated egg, the coagulated egg being dispersed throughout the uncoagulated egg with the water soluble edible gum acting as a vehicle for preventing free separation of any moisture content of the mixture upon thawing of said mixture.

SAMUEL TRANIN.